(12) United States Patent
Lewinton et al.

(10) Patent No.: US 11,995,973 B2
(45) Date of Patent: May 28, 2024

(54) WEARABLE DEVICE

(71) Applicant: Buddi Limited, Rickmansworth (GB)

(72) Inventors: Charles Lewinton, Rickmansworth (GB); Sara Murray, Rickmansworth (GB); Brad Buike, Rickmansworth (GB)

(73) Assignee: Buddi Limited, Rickmansworth Hertfordshire (GB)

( * ) Notice: Subject to any disclaimer, the term of this patent is extended or adjusted under 35 U.S.C. 154(b) by 0 days.

(21) Appl. No.: 18/336,848

(22) Filed: Jun. 16, 2023

(65) Prior Publication Data

US 2023/0351881 A1 Nov. 2, 2023

Related U.S. Application Data

(63) Continuation of application No. PCT/GB2021/053237, filed on Dec. 10, 2021.

(30) Foreign Application Priority Data

Dec. 18, 2020 (GB) ..................................... 2020208

(51) Int. Cl.
*G06F 1/16* (2006.01)
*G08B 21/02* (2006.01)
*G08B 21/22* (2006.01)

(52) U.S. Cl.
CPC ............. *G08B 21/22* (2013.01); *G06F 1/163* (2013.01); *G08B 21/0286* (2013.01)

(58) Field of Classification Search
CPC ...... G08B 21/22; G08B 21/0286; G06F 1/163
See application file for complete search history.

(56) References Cited

U.S. PATENT DOCUMENTS 5,512,879 A * 4/1996 Stokes ............... G08B 21/0288
455/100
5,978,493 A * 11/1999 Kravitz ................... G09F 3/005
283/75

(Continued)

FOREIGN PATENT DOCUMENTS

CN 207186151 4/2018
CN 207885802 9/2018

(Continued)

OTHER PUBLICATIONS

GB Patent Application No. GB2020208.1; UKIPO Search Report dated Jun. 2, 2021 ; 4 pages.
PCT/GB2021/053237 International Preliminary Report on Patentability, dated Dec. 6, 2022; 18 pages.

(Continued)

*Primary Examiner* — Muhammad Adnan
(74) *Attorney, Agent, or Firm* — Haynes and Boone, LLP

(57) ABSTRACT

The disclosure relates to a wearable device 200 for tracking a subject. It includes a flexible member attachable on a limb of the subject, an electronic circuit 210 and a connector 230. The flexible member has a first portion 220a comprising a first set of conducting channels, and a second portion 220b comprising a second set of conducting channels. The electronic circuit 210 is coupled to the first portion and the second portion. The connector 230 is adapted to connect the first portion to the second portion. Upon connection at least one channel from the first set is connected to a channel from the second set to obtain a channel connection.

16 Claims, 9 Drawing Sheets

(56) References Cited

U.S. PATENT DOCUMENTS

| | | | |
|---|---|---|---|
| 6,195,009 B1* | 2/2001 | Irizarry | G08B 21/0288 340/568.1 |
| 9,569,957 B2* | 2/2017 | Williams | G08C 19/04 |
| 10,372,164 B2* | 8/2019 | Huitema | G06F 3/0346 |
| 11,151,542 B2* | 10/2021 | Senguttuvan | G06F 21/88 |
| 11,284,837 B1* | 3/2022 | Matthews | G08B 21/0286 |
| 2003/0030561 A1* | 2/2003 | Yafuso | G08B 21/0227 340/573.4 |
| 2004/0189470 A1* | 9/2004 | Girvin | G08B 13/2454 340/568.2 |
| 2005/0121898 A1* | 6/2005 | Laackmann | G08B 21/0288 283/70 |
| 2006/0092028 A1 | 5/2006 | Lerch et al. | |
| 2011/0248853 A1 | 10/2011 | Roper et al. | |
| 2014/0070957 A1* | 3/2014 | Longinotti-Buitoni | A61B 5/02055 340/870.01 |
| 2014/0073486 A1* | 3/2014 | Ahmed | A61B 5/7267 600/479 |
| 2014/0124389 A1* | 5/2014 | Borlenghi | A45F 5/00 206/37 |
| 2014/0179347 A1 | 6/2014 | Murray et al. | |
| 2014/0318699 A1* | 10/2014 | Longinotti-Buitoni | H05K 1/095 156/247 |
| 2015/0098077 A1 | 4/2015 | Findlay | |
| 2017/0023971 A1* | 1/2017 | Lee | G02C 5/20 |
| 2017/0316677 A1 | 11/2017 | Messier et al. | |
| 2019/0066475 A1* | 2/2019 | Bordelon | A01M 29/24 |
| 2019/0132948 A1* | 5/2019 | Longinotti-Buitoni | A61B 5/6805 |
| 2019/0254919 A1* | 8/2019 | Coney | A61H 3/02 |
| 2020/0229515 A1* | 7/2020 | Poupyrev | G06F 3/044 |
| 2023/0172287 A1* | 6/2023 | Ozer | A61F 6/04 361/679.03 |

FOREIGN PATENT DOCUMENTS

| | | |
|---|---|---|
| DE | 20107032 U1 | 9/2001 |
| WO | WO 00/04522 | 1/2020 |

OTHER PUBLICATIONS

PCT/GB2021/053237 International Search Report and Written Opinion, dated Apr. 4, 2022; 12 pages.

* cited by examiner

WEARABLE DEVICE

CROSS REFERENCE TO RELATED APPLICATIONS

The present invention is a Continuation of International Patent Application No. PCT/GB2021/053237, filed Dec. 10, 2021, which claims priority to Great Britain Patent Application No. 2020208.1, filed Dec. 18, 2020, all of which are incorporated by reference herein in their entirety.

TECHNICAL FIELD

The present disclosure relates to a wearable device for tracking a subject. In particular, the present disclosure relates to a wearable device provided with a fastening mechanism designed to identify an attempt to tamper or remove the wearable device.

BACKGROUND

Law enforcement authorities can use ankle bracelets also referred to as ankle tags to track persons of interest. Additional to ankle bracelets, wristbands are increasing in popularity for tracking subjects at a low risk of absconding. These devices may contain various combination of tracking and secure identification technology including global navigation satellite system(s) GNSS(s), WiFi location identification, radio-frequency beacon pairing, inertial navigation aids and fingerprint recognition systems, among others. The tracking of the individual wearer has been covered in several patent documents including US2015/098077, US2011/0248853 and US2014179347.

Various methods may be used for determining that a tracking-device has not been removed from the wearer. In a first approach, light is passed through an optical fibre which runs the length of the securing strap forming an optical connection between one side of the tag and the other. If the optical connection is broken the tag sends an alert to a remote computer server for triggering a response. In a second approach the optical connection is replaced by an electrical connection. In this case the electrical connection can be made by a conducting joining mechanism such as a clasp or a screw that connects a conductor in a strap protruding from one side of the tag to one on the other.

Current systems are implemented with a strap joined at either end to a tag. The strap having a fixed length, multiple strap lengths must be made available to allow fitting to a range of subjects, or alternatively the strap should be trimmed during the fitting procedure.

Other systems that rely on dual electrically conductive straps fixed together with a conducting clasp with a number of holes which provide access to conductive members integral with each strap, can be removed relatively easily without triggering an alarm. For instance, the subject wearing the device may bypass the security mechanism by forming a circuit external to the band (formed of the tag, the two straps and a clasp), then cut the band and remove it without triggering an alert signal.

WO 00/04522 A1 describes an electric band tag in which ID information is stored as a coded pattern of open and closed circuits. US 2005/121898 A1 describes an authenticity tag that includes a carrier for attachment to an object. CN 207885802 U describes a tamper-resistant watchband assembly.

It is an object of the disclosure to address one or more of the above-mentioned limitations.

SUMMARY

According to an aspect of the disclosure, there is provided a wearable device comprising a flexible member attachable on a limb of a subject, the flexible member having a first portion comprising a first set of conducting channels, and a second portion comprising a second set of conducting channels; an electronic circuit coupled to the first portion and the second portion; a connector adapted to connect the first portion to the second portion, wherein upon connection at least one channel from the first set is connected to a channel from the second set to obtain a channel connection.

Optionally, the electronic circuit is adapted to store a series of predetermined channel connections between pairs of channels, wherein each pair of channels comprises a channel from the first portion and a channel from the second portion.

Optionally, the electronic circuit is adapted to compare a channel connection with a predetermined channel connection.

Optionally, the electronic circuit is adapted to send an alarm signal upon identifying that a channel connection is different from a predetermined channel connection. For instance, the alarm signal may include the time and at least one of a location data and an identifier identifying the device. Alternatively, the alarm signal may be an audible signal.

Optionally, the electronic circuit comprises a transmitter circuit coupled to the first set of conducting channels, a receiver circuit coupled to the second set of conducting channels, a controller coupled to both the transmitter circuit and a receiver circuit, and a storage medium configured to store predetermined channel connections. For example, the transmitter circuit may be a logic circuit for sending a logic signal, and the receiver circuit may be a logic circuit for receiving a logic signal.

Optionally, the transmitter circuit is adapted to send at least one signal to the first set of conducting channels, and wherein the receiver circuit is adapted to receive the said at least one signal from the second set of conducting channels. For instance, a same signal may be sent to all channels within the first set of conducting channels. Alternatively different signals may be sent to different channels within the first set of conducting channels.

Optionally, the controller is adapted to identify to which channel among the first set of conducting channels the signal has been sent, and from which channel among the second set of conducting channels the signal has been received to obtain a channel connection identity.

Optionally, the controller is adapted to compare the channel connection identify with a predetermined channel connection and to generate an alarm signal upon identifying that the channel connection identity is different from the predetermined channel connection.

Optionally, the first portion has a first set of apertures, and the second portion has a second set of apertures.

Optionally, each conducting channel has a first end provided at an edge of an aperture and a second end provided at a terminal connectable to the electronic circuit.

Optionally, the flexible member comprises additional conducting channels configured to provide a connection between multiple apertures.

Optionally, the flexible member comprises another conducting channel extending between a first terminal connectable to the electronic circuit and a second terminal connectable to the electronic circuit, wherein the conducting channel extends within both the first portion and the second portion of the flexible member. For example, the conducting channel may be a peripheral conducting channel forming a peripheral loop extending along a perimeter of the flexible member between the first terminal and the second terminal.

Optionally, the flexible member comprises an antenna, wherein the antenna is formed by a conducting channel.

Optionally, the electronic circuit comprises a location device adapted to receive location data.

Optionally, the electronic circuit comprises a communication module. For instance, the communication module may include a transmitter and a receiver.

Optionally, the flexible member comprises a flexible printed circuit board.

Optionally, the electronic circuit is part of the flexible printed circuit board.

Optionally, the connector comprises a plurality of projecting members. For example, the connector may have more than two projecting members. For instance, the connector may have an even number of projecting members such as 4 or 6 or 8 projecting members. The connector may be a clasp.

Optionally, the connector comprises a base portion from which extends the plurality of projecting members and a cover portion adapted to clamp onto the projecting members.

Optionally, the cover portion comprises electrically insulating regions to prevent conduction between projecting members.

DETAILED DESCRIPTION

Figure 1:
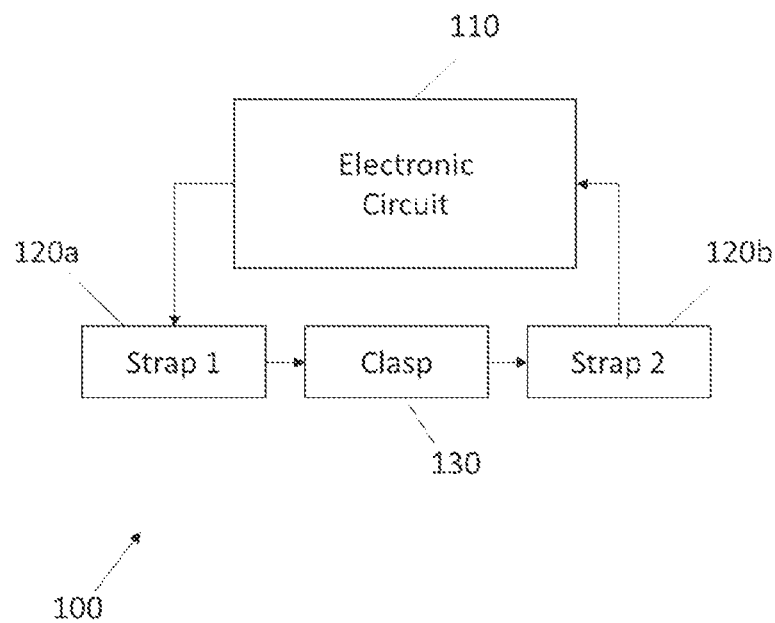
FIG. 1 is a diagram of a wearable device for tracking a subject.

FIG. 1 illustrates a wearable device 100 for tracking a subject. The wearable device includes an electronic circuit 110 coupled to a flexible member 120 attachable on a limb of the subject. For instance, the flexible member may be a wrist-band attachable to the wrist or an ankle-band attachable to the ankle of the subject. The flexible member or band 120 is formed of a first portion 120a, also referred to as first strap, and a second portion 120b also referred to as second strap. The first and second portions are releasably connected to each other via a connector or fastener 130.

The first portion 120a includes a first set of conducting channels, and the second portion 120b includes a second set of conducting channels. The electronic circuit 110 is coupled to both the first portion and the second portion. The connector 130 is adapted to connect the first portion 120a to the second portion 120b, and upon connection at least one channel from the first set is connected to a channel from the second set to obtain a channel connection. The connector 130 may have interlocking parts to bring the first portion 120a in contact with the second portion 120b. For example, the connector may be a clasp. When the connector or clasp is in place a conducting channel from the first portion and a conducting channel from the second portion may form a closed loop via the electronic circuit 110.

The electronic circuit 110 is adapted to store a series of predetermined channel connections between several pairs of channels. Each pair of channels includes a conducting channel from the first portion and a conducting channel from the second portion. For example, if the first portion has four channels and the second portion has also four channels, all labelled CH1 to CH4, an example of predetermined channel connection may be a list CH1/CH3, CH2/CH4 indicating that channel 1 of first portion should be connected to the channel 3 of the second portion and that channel 2 of first portion should be connected to the channel 4 of the second portion. The electronic circuit 110 is also adapted to compare a channel connection with a predetermined channel connection and to identifying whether a channel connection is different from a predetermined channel connection. If this is the case the electronic circuit 110 may be configured to generate and send an alarm signal to a third party. The alarm signal may be a message that includes various information including time, the location of the device, and an identifier identifying the device.

The electronic circuit 110 may be designed to perform the electrical functions of a tag. The flexible member 120 may include a flexible printed circuit board PCB that contains a plurality of connecting channels or tracks. In this instance, the electronic circuit is connected to the flexible PCB in the band for the purpose of detecting made and broken channel connections. The flexible PCB may also have an area that is rigid. In this case the PCB may be referred to as a flexi-rigid PCB. The band may be made in one piece with the electronic circuit being embedded in the band. The flexible PCB may be integrated into the band structure during plastic moulding. In this case the electronic circuit may be formed as part of the PCB.

In an alternative embodiment the electronic circuit may be designed to be separate from the band structure. In this case the electronic circuit may be provided in a housing also referred to as electronic pod that can be connected to and disconnected from the band. On connection the electronic circuit makes an electrical contact with the channels present in the band via a plurality of terminals.

The flexible member 120 may also include connecting features to join the first portion 120(a) to the second portion allowing to adjust the length of the band and provide an appropriate fit.

Figure 2A:
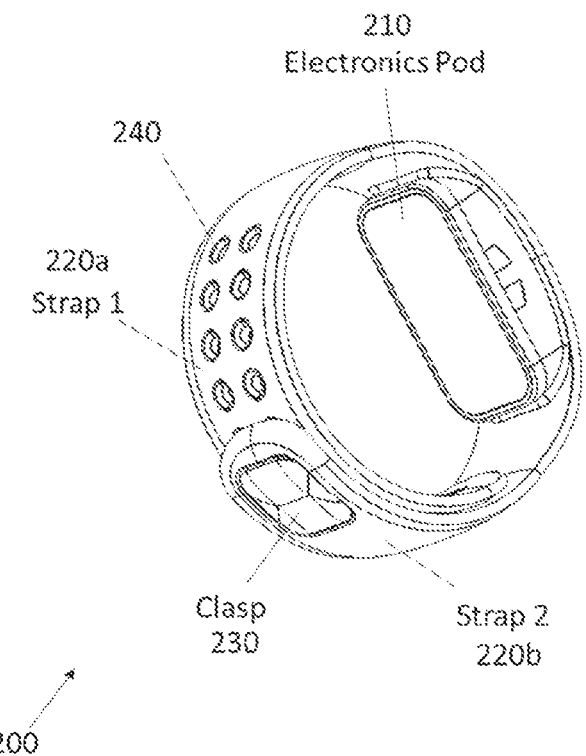
FIG. 2A is a profile view of an exemplary wearable device.

FIG. 2A shows an exemplary embodiment of the wearable device of FIG. 1. The wearable device 200 includes an electronic circuit provided in a housing referred to as electronic pod 210. The electronic pod is coupled to a band 220 having first portion 220a and a second portion 230b. In this example, the first portion 220a and the second portion 220b are integrally formed. The first portion 220a has a first set of apertures 240, also referred to as mechanical connection holes, distributed along a length of the band 220.

Similarly, the second portion 220b has a second set of apertures. A connector or clasp 230 is provided to connect the two portions.

The wearable device 200 can be used as a tracking device or tag, to track low risk offenders and individuals under curfew restrictions for other reasons such as those imposed by immigration officials. The device 200 may be applied to the wearer by a monitoring officer, for instance a policeman, a parole officer or immigration officer.

Figure 2B:
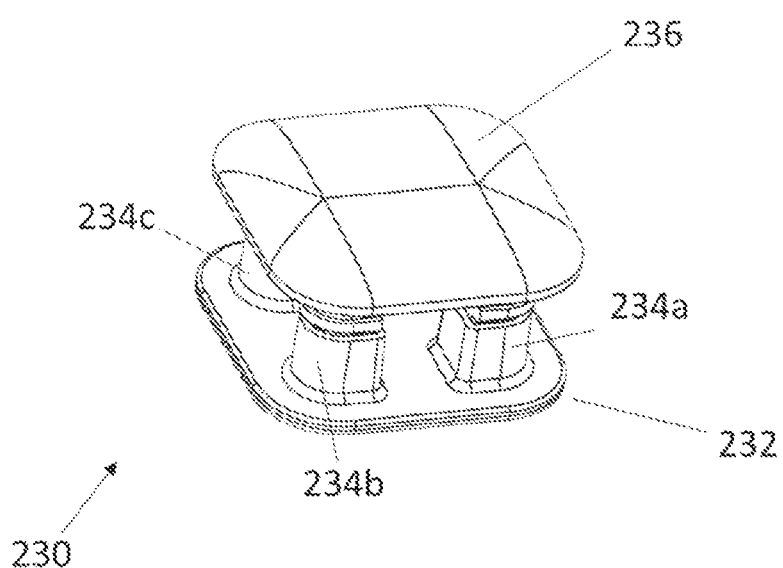
FIG. 2B is a profile view of a clasp for use in the wearable device of FIG. 2A.

FIG. 2B is a profile view of the clasp 230 of FIG. 2A. The clasp 230 has a base 232 from which extends four projecting members, also referred to as pins or prongs 234a, 234b, 234c, 234d. A removable lid or cover 236 is provided to clamp onto the pins. The lid may be provided with an interlocking mechanism for each pin. For example, four recess may be implemented, each recess providing an interfering fit with a corresponding pin. Each projecting member or pin may be designed to engage with the apertures 240. When connection holes are joined by the clasp an electrical connection is made. The design of the clasp is such that the connection is made at a hole-to-hole level and not across the whole clasp. For instance, the lid 236 may be electrically insulating between the channels formed by the pins.

Figure 3A:
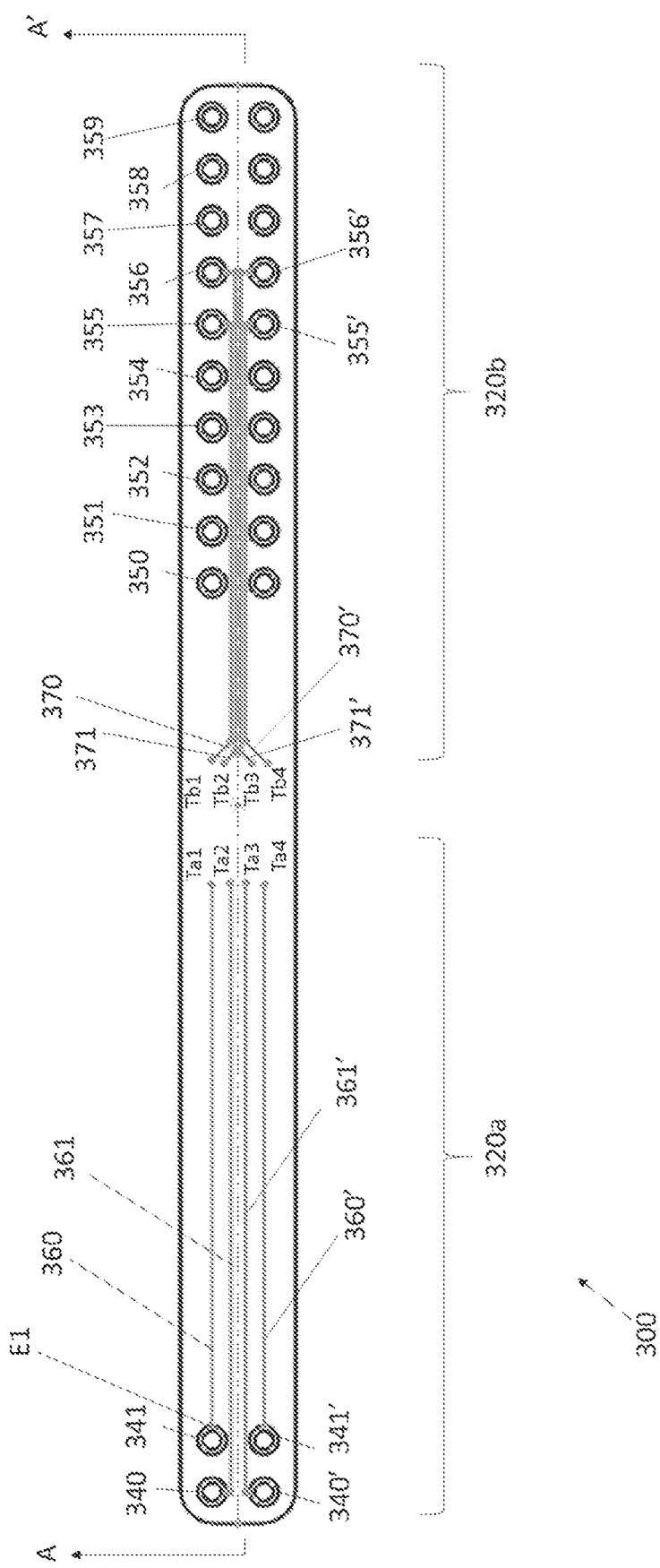
FIG. 3A is a cross sectional view of a band for use in the wearable device of FIG. 2A.

FIG. 3A is a cross sectional view (section A-A') of a band 300 for use in the wearable device of FIG. 2A. The conducting channels made visible for the purpose of the description, are in fact embedded into the band structure and therefore would be invisible to the wearer of the device. The wristband 300 has a first portion 320a and a second portion 320b. The first portion 320a has a first set of apertures. In this example the first set includes apertures 340 and 341 distributed along a top axis and apertures 340' and 341' distributed along a bottom axis. Similarly, the second portion 320b has a second set of apertures. In this example the second set includes apertures 350, 351, 352, 353, 354, 355, 356, 357, 358, and 359 distributed along the top axis and apertures 350'-359' distributed along the bottom axis.

The first portion includes a plurality of conducting channels or tracks forming a first network or first set of conducting channels. In this example the first set has four channels labelled 360, 361, 360' and 361'. Each conducting channel extends between a first end provided at an edge of an aperture, and a second end provided at a terminal for connecting to the electrical circuit. For instance, the channel 360 extends between a first end provided at the edge E1 of the aperture 341 and a second end provided at a terminal Ta1 for connecting to the electronic circuit. Similarly, the second portion includes a plurality of conducting channels forming a second network or second set of conducting channels. In this example the second set has twenty channels. For clarity only four channels are represented labelled 370, 371, 370' and 371'. The channel 370 extends from an edge of aperture 355, and the channel 371 extends from an edge of aperture 356. Similarly, the channel 370' extends from an edge of aperture 355', and the channel 371' extends from an edge of aperture 356'.

It will be appreciated that the number of apertures provided on the first portion and the second portion may vary. For instance, both portions may be provided with a same number of apertures.

Figure 3B:
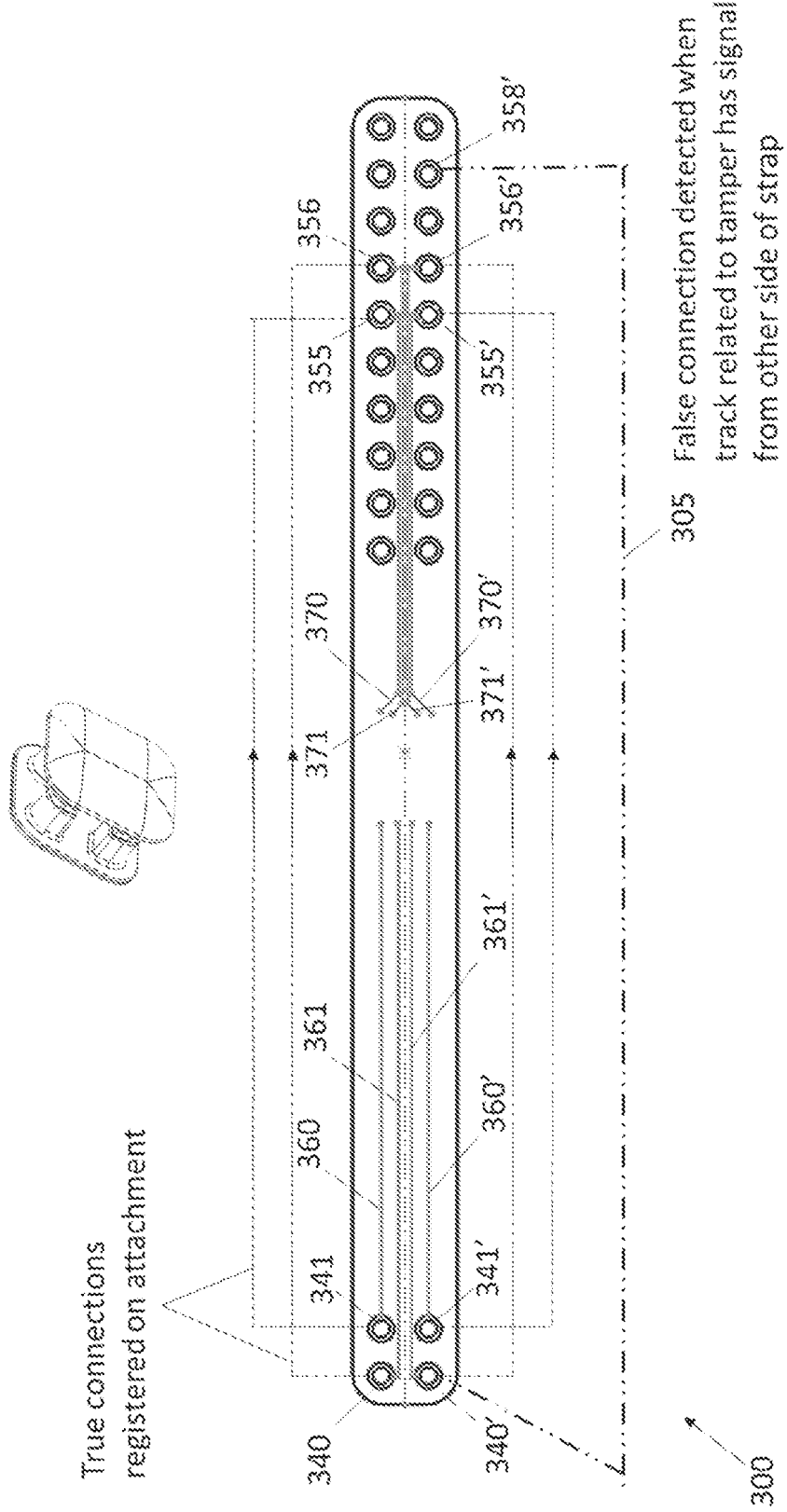
FIG. 3B is a cross sectional view of a band showing true and false connections.

FIG. 3B is a schematic representation illustrating the connections established in the wristband 300, when the clasp 230 is in place. As shown in FIG. 2B, the connector 230 has four pins. When a four-pin clasp is used to join the first and the second band portions, four separate connections are made completing the circuit between four separate tracks on one portion of the band (strap 1) and four tracks on the other portion (strap 2). The apertures 340, 341, 340' and 341' of the first set are used with another four apertures of the second set to adjust the length of the band and provide channel connections.

In this example, a first pin connects apertures 340 and 356 hence establishing a first loop that includes the channel 361, the channel 371 and the electronic circuit (not shown). A second pin connects aperture 341 and 355 hence establishing a second loop that includes the channel 360, the channel 370 and the electronic circuit (not shown). Similarly, another two loops are formed using the pairs of apertures 340'/356' and 341'/355'.

Therefore, when the connector/clasp 230 is locked in position each pin connects at least two conductive channels together to form a loop via the electronic circuit. In this example, once the clasp is applied four loops are formed.

If someone attempts to bypass the clasp connection in an attempt to remove the band undetected, they will make a circuit between two, or more, tracks on opposite sides of the band and that connection can be detected and an alert can be signalled by the electronic circuit. An example of such a false connection 305 is shown between aperture 340' and aperture 358'.

Figure 4:
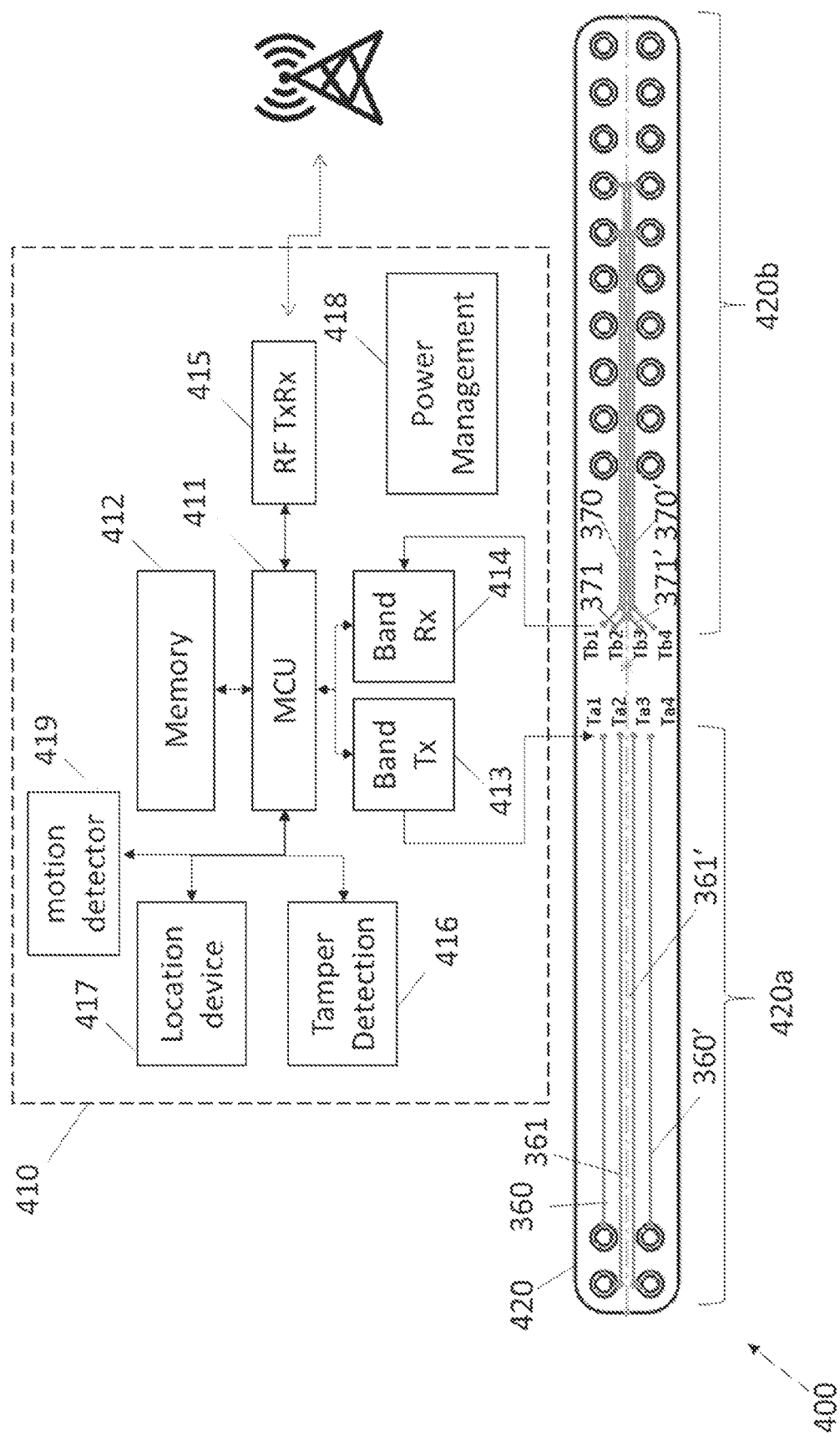
FIG. 4 is a diagram of an electronic circuit coupled to a band as shown in FIG. 3A.

FIG. 4 is a diagram of a wearable device 400. The wearable device includes an electronic circuit 410 coupled to a flexible member 420. In this example the flexible member 420 is a band as described above with reference to FIGS. 3A and 3B. The electronic circuit 410 includes a controller, such as a microcontroller 411 coupled several circuit elements including a storage medium or memory 412, a transmitter circuit 413, a receiver circuit 414, a communication module 415, a tamper detection circuit 416 and a location device 417 for detecting the position/location of the wearer. The electronic circuit 410 also includes a power management circuit 418 that includes a rechargeable battery and power connection to recharge the battery when appropriate. The electronic circuit may also include other components including a motion detector 419 and a timer (not shown). The motion detector 419 may include at least one of an accelerometer and a gyroscope.

The transmitter circuit 413 is coupled to the conductive channels present in the first strap portion 420a via the terminals Ta1-Ta4. Similarly, the receiver circuit 414 is coupled to the conductive channels present in the second strap portion 420b via the terminals Tb1-Tb4. The connection between the circuit 413 and the terminals Ta1-Ta4 may be achieved by multiple connection lines (one for each channel) or by a single line coupled to four switches associated with each channel. The connection between the circuit 414 and the terminals Tb1-Tb4 may be achieved in a similar fashion.

The transmitter circuit 413, is adapted to provide a signal per channel in the first portion 420a. This may be achieved in parallel or sequentially. A same signal may be sent to all channels within the first set of conducting channels. Alternatively different signals may be sent to different channels within the first set of conducting channels. The signal or signals may be implemented in different ways as analogue or digital signals. For instance, a signal can be a voltage pulse with a predefined voltage range, a current pulse with a predefined current range, or a time-dependent pattern of pulses. Other possible implementations may include the use of an RF signal.

In a specific example, the transmitter circuit 413 may send a current signal to the channels 360, 361, 360' and 361', respectively. The receiver circuit 414 is adapted to receive the signal from the channels present on the second portion

420b. For instance, following the connections established in FIGS. 3B and 3C, the second logic circuit 414 may receive a current signal from the channels 370, 371, 370' and 371'. It will be appreciated that the connections of the circuit 413 and 414 may be reversed. The transmitter and receiver circuits may be implemented as logic circuits for sending and receiving a logic signal, or a plurality of logic signals. The transmitter and receiver circuits could also be implemented using the digital inputs/outputs of the MCU 411.

On application, the connector or clasp forms several separate loop circuits between the tracks related to the two halves of the band. The signals generated by the circuit 413 and transmitted into one half of the band will appear in separate channels in the other half of the band. There separate channels are then identified by the receiver circuit 414 and the combination of channels used stored in the memory 412 and/or sent to a remote server via the communication module 415.

The memory 412 is configured to store a list of channel combinations, also referred to as predetermined channel connections or connection codes. For instance, the channel combinations may be stored as a lookup table. Following the example of FIGS. 3A and 3B, the memory may store information indicating that the channel 361 is associated with the channel 371, the channel 360 is associated with the channel 370, the channel 361' is associated with the channel 371', the channel 360' is associated with the channel 370'. As explained above these channel combinations may be set when the wearable device is attached to the wearer.

The controller 411 is configured to control the circuits 413 and 414, and store information in the memory 412.

The tamper detection circuit 416 is used to check the integrity or status of the band 400. If there is a change to the stored connection code without prior authorisation, then an alarm signal may be communicated. The tamper detection circuit 416 is configured to identify if a received signal is coming from an expected channel or from a non-expected channel based on the information stored in the memory 412. For instance, following the previous example, if a signal is sent to the channel 360, the signal should be received via the channel 370. If the signal is not received at all or received from another channel, then the circuit 416 can identify that the band has been tampered with. When such an event occurs, the microcontroller 411 is configured to send information, referred to as alarm signal, to a third party via the communication module 415. The alarm signal may include information relating to the time at which interference occurred and the location of the wearable device. It may also include an identifier. Alternatively, or in combination the alarm signal may include an audio signal.

The location device/circuit 417 is adapted to interrogate one, or a plurality of position signals also referred to as location information arising from external sources. Location information may include GNSS location data from GPS GLONASS or another satellite source; location data derived from WiFi signals; location data derived from the mobile phone cellular network; or location data derived from a custom radio frequency RF beacon device, which may be directly associated with the band. For instance, the RF beacon may be an RF source with an identified signature that is linked to the wearable device to verify the whereabouts of the device and therefore the individual wearing it. The RF beacon may be adapted to verify its location. If the wearer leaves the vicinity of the RF beacon during a curfew period, then an alarm may be triggered.

The communication module 415 includes a transmitter and a receiver. The communication module 415 may be adapted to communicate with a cellular network or a remote device which can be connected to either the cellular network or the internet via a wireless or wired link. The communication module 415 may be adapted to connect to these networks for various ranges of signal strengths.

It will be appreciated that various functions of the circuit 410 may be implemented in different fashion. For instance, the tamper detection circuit 416 may be integrated as part of the controller 411. The circuit 413 and 414 may be implemented as a single circuit.

Figure 5:
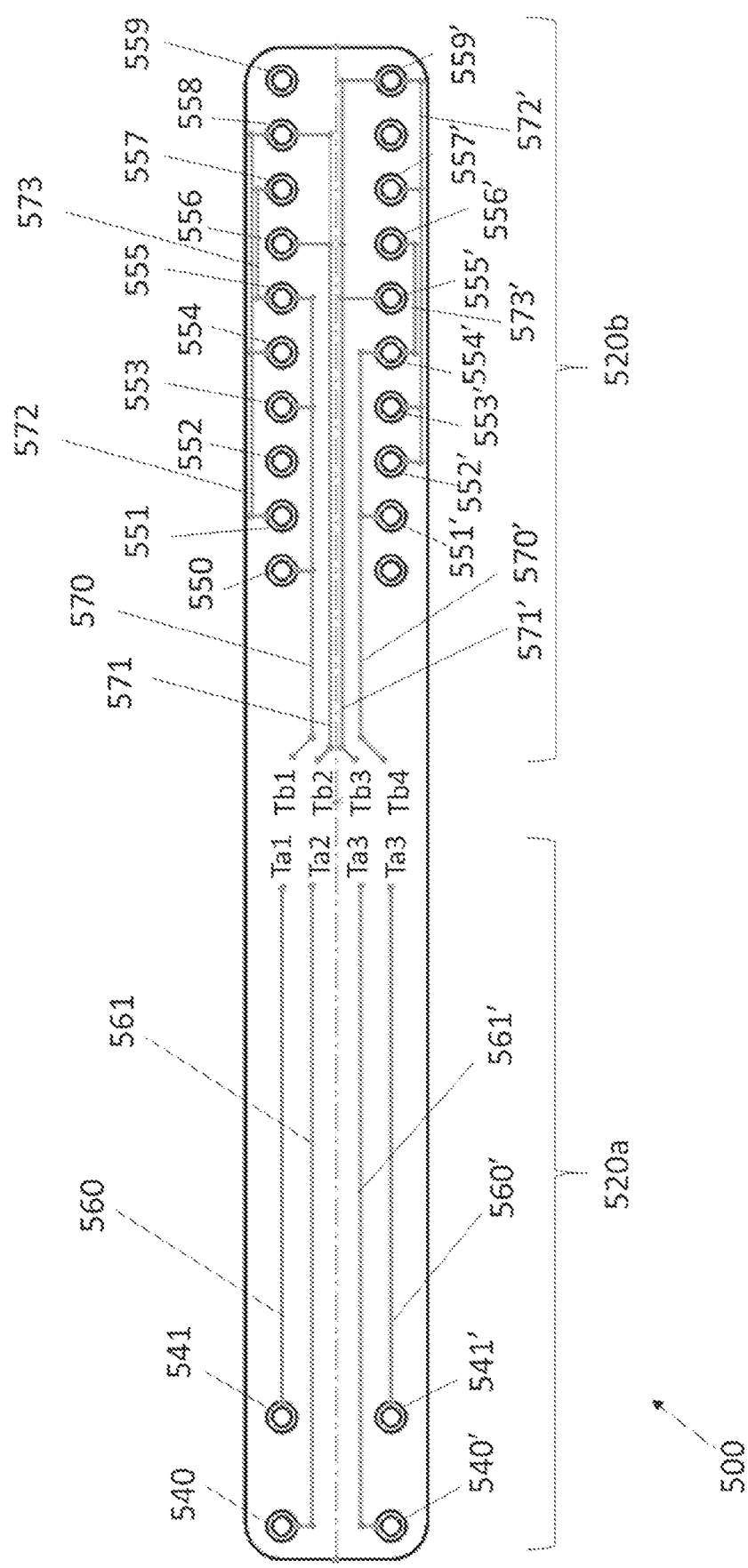
FIG. 5 is a cross sectional view of a band provided with a pseudo-random channel pattern.

FIG. 5 shows a band 500 provided with another channel pattern referred to as pseudo-random pattern. In this example the conducting channels on the second portion 520b are connected to the edges of multiple apertures, and additional channels are provided to connect multiple apertures to each other.

The top row of apertures 550-559 is provided with channels 570, 571, 572 and 573. The channel 570 is connected to the edges of three apertures 550, 553 and 555. The channel 571 is connected to the edges of two apertures 556 and 558. The additional channel 572 is provided to connect the edges of apertures 551, 554 and 558. The additional channel 573 is provided to connect the edges of apertures 555 and 557.

The bottom row of apertures 550'-559' is provided with channels 570', 571', 572' and 573'. The channel 570' is connected to the edges of apertures 551' and 554'. The channel 571' is connected to the edges of apertures 555' and 559'. The additional channel 572' is provided to connect the edges of apertures 552', 553', 557' and 559'. The additional channel 573' is provided to connect the edges of apertures 554' and 556'. The pattern of connections may be varied by changing the number of channels and the connections between apertures. In the above example, every aperture in the band does not require a separate connection to the electronic circuit. Instead, a single channel can be used to address multiple apertures which are connected to each other.

Figure 6:
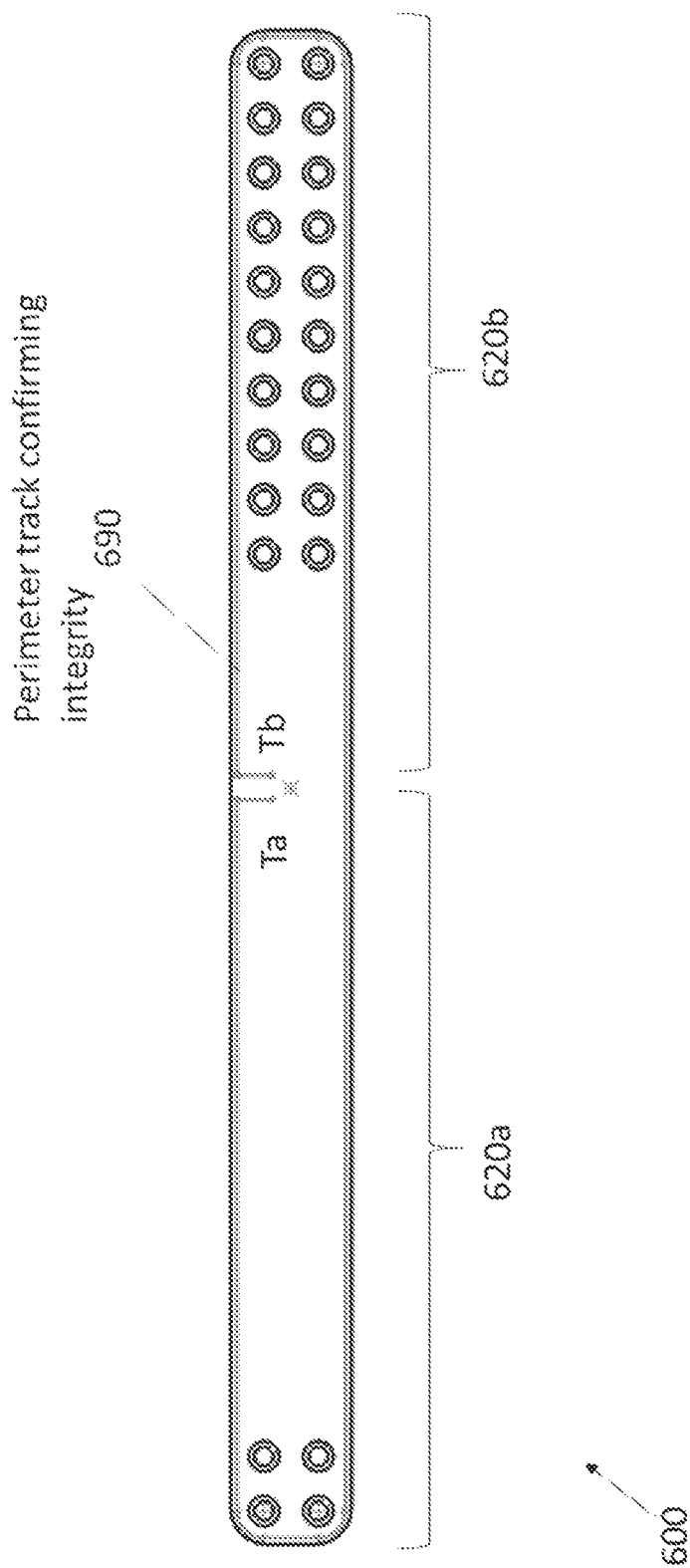
FIG. 6 is cross sectional view of a band provided with a peripheral channel.

FIG. 6 illustrates another band 600 provided with a loop channel across both portions of the band. The band 600 is provided with an outer or peripheral conducting channel 690 extending from a terminal Ta provided on the first portion 620a to a second terminal Tb provided on the second portion 620b. Like in previous examples the terminals Ta and Tb are used to connect the channel 690 to the electronic circuit. The peripheral conducting channel 690 extends along a perimeter of the band 600. The channel 690 can be used to check if there has been an attempt to cut the band 600. For instance, the tamper detection circuit 416 may be configured to identify that when a signal is sent through the channel 690 the signal is received unchanged. If the signal has been modified or if no signal is received at all, then it can be identified that the channel 690 has been broken. An alarm signal may be generated and sent to a monitoring officer via a remote server. It will be appreciated that the location of the loop channel 690 may be varied. For instance, the channel 690 could form a loop located in a central region of the band, extending from the terminal Ta to an end region of the first portion 620a (between the aperture of the first set), to an end region of the second portion 620b (between the apertures of the second set) and to the terminal Tb.

Figure 7:
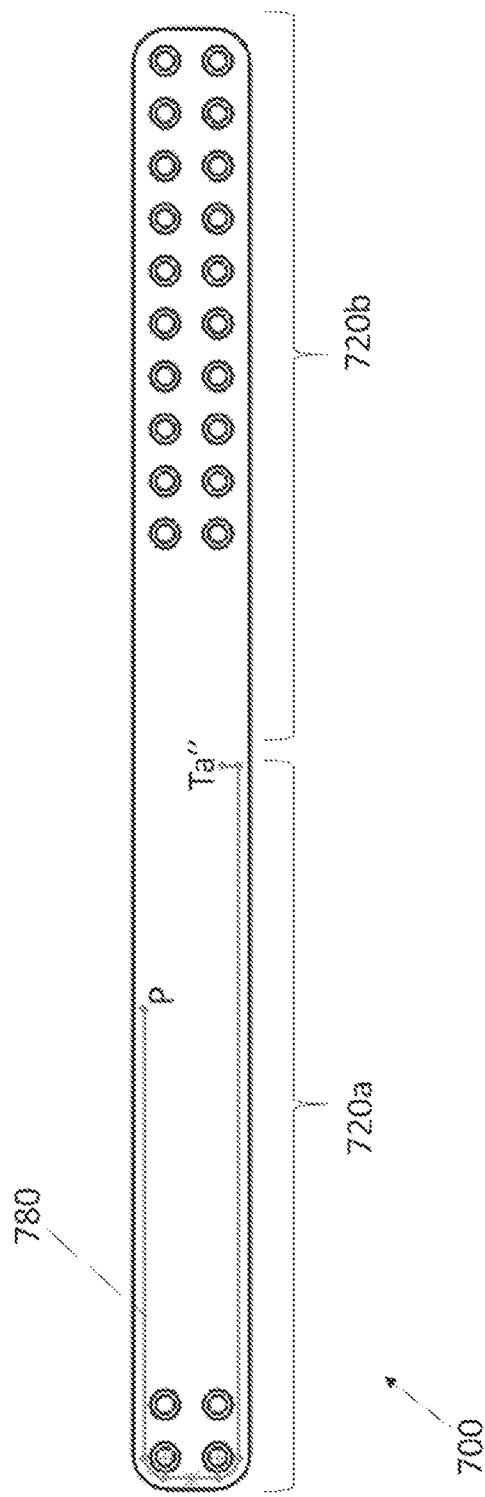
FIG. 7 is cross sectional view of a band provided with an antenna.

FIG. 7 shows another band 700. The band 700 is provided with an antenna 780. In this example the antenna 780 is formed by a channel provided on the first portion 720a and extending from a terminal Ta" up to an end point P. The terminal Ta" permits connection of the antenna 780 to the electronic circuit for receiving and treating information data.

A band may include a plurality of antennae. For instance, a first antenna may be provided to receive location data, and a second antenna may be provided to communicate with a remote server. Optionally one or more antennae may be made into a flexible PCB for interrogating the band integrity.

Figure 8:
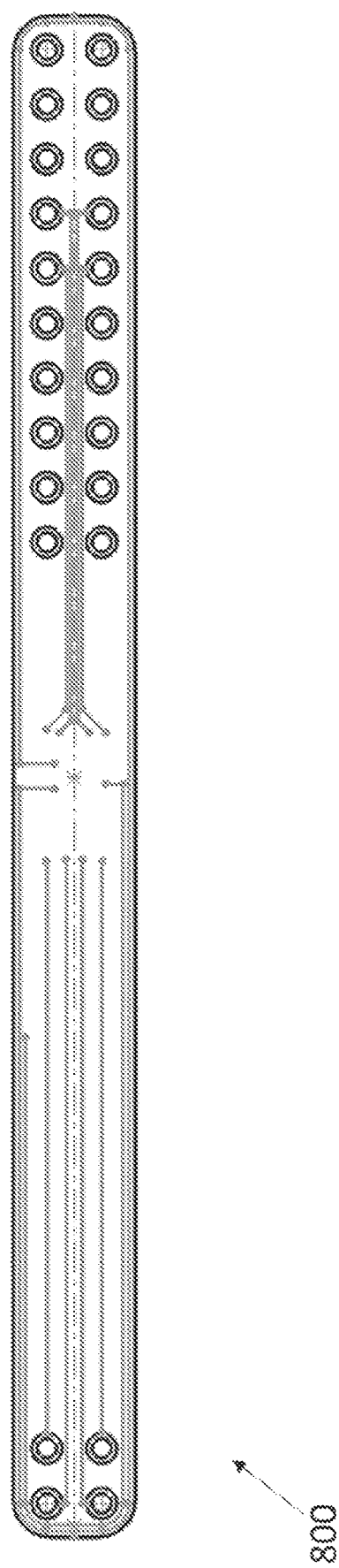
FIG. 8 is cross sectional view of a band as shown in FIG. 3A provided with a peripheral channel and an antenna.

FIG. 8 shows a band 800 provided with a network of channels as described in FIG. 3A, a perimeter channel as described in FIG. 6 and an antenna as described in FIG. 7. The band 800 may also contain other channels to provide additional functionalities such as providing an earth plane or providing test points. As mentioned above the band may include a flexible PCB and the channels can be formed within the PCB. In this case the channels of the flexible PCB are connected to the electronic circuit.

The wearable device as described above with reference to FIGS. 1 to 8 provides a mechanism allowing to connect two portions of a band and to detect if the band has been cut or removed after replacing the clasp in the circuit or tampered with in another way. As a result, the wearable device of the disclosure is designed to foil such removal attempts and provides a secure tracking band.

It will be appreciated that various modifications of the device may be implemented. The connector or clasp can be implemented in different ways, and several hole configurations could be envisaged. FIGS. 3A and 3B show a band with two lines of holes suitable for a clasp containing 2, 4 or 6 connector pins. Alternatively, a band can be designed with one line of connector holes where the clasp locates on the edges of the band or due to a plurality of connector pins. In another implementation a band can be designed with three lines of holes with one line chosen for connection.

In yet another example the clasp can be designed to pierce the band with conducting pins piercing an underlying flexible PCB to make the connection between hidden pads. In this case the electrical connection can either be made by pins directly penetrating the flexible PCBs in one or both portions of the band and thus making the mechanical connection at the same time. Alternatively, the pins may be designed to only touch the pads on the flexible PCB to make the electrical connection, and the mechanical connection is made by another pin which locates in through-holes in each strap.

A skilled person will therefore appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A wearable device comprising
a flexible member attachable on a limb of a subject, the flexible member having a first portion comprising a first set of conducting channels, and a second portion comprising a second set of conducting channels;
an electronic circuit coupled to the first portion and the second portion;
a connector adapted to connect the first portion to the second portion, wherein upon connection at least one channel from the first set is connected to a channel from the second set to obtain a channel connection;
wherein the first portion has a first set of mechanical connection holes, and the second portion has a second set of mechanical connection holes;
wherein each conducting channel has a first end provided at an edge of a mechanical connection hole and a second end provided at a terminal connectable to the electronic circuit;
wherein the connector comprises more than two projecting members, each projecting member being designed to engage with a mechanical connection hole; and
wherein
the wearable device further comprising a controller adapted to compare a channel connection identity with a predetermined channel connection and to generate an alarm signal upon identifying that the channel connection identity is different from the predetermined channel connection.

2. The wearable device as claimed in claim 1, wherein the electronic circuit is adapted to store a series of predetermined channel connections between pairs of channels, wherein each pair of channels comprises a channel from the first portion and a channel from the second portion.

3. The wearable device as claimed in claim 2, wherein the electronic circuit is adapted to compare a channel connection with a predetermined channel connection.

4. The wearable device as claimed in claim 1, wherein the electronic circuit is adapted to send an alarm signal upon identifying that a channel connection is different from a predetermined channel connection.

5. The wearable device as claimed in claim 1, wherein the electronic circuit comprises
a transmitter circuit coupled to the first set of conducting channels,
a receiver circuit coupled to the second set of conducting channels, and
a storage medium configured to store predetermined channel connections;
wherein the controller is coupled to both the transmitter circuit and the receiver circuit.

6. The wearable device as claimed in claim 5, wherein the transmitter circuit is adapted to send at least one signal to the first set of conducting channels, and wherein the receiver circuit is adapted to receive the said at least one signal from the second set of conducting channels.

7. The wearable device as claimed in claim 6, wherein the controller is adapted to identify to which channel among the first set of conducting channels the signal has been sent, and from which channel among the second set of conducting channels the signal has been received to obtain the channel connection identity.

8. The wearable device as claimed in claim 1, wherein the flexible member comprises additional conducting channels configured to provide a connection between multiple mechanical connection holes.

9. The wearable device as claimed in claim 1, wherein the flexible member comprises another conducting channel extending between a first terminal connectable to the electronic circuit and a second terminal connectable to the electronic circuit, wherein the conducting channel extends within both the first portion and the second portion of the flexible member.

10. The wearable device as claimed in claim 1, wherein the flexible member comprises an antenna, wherein the antenna is formed by a conducting channel.

11. The wearable device as claimed in claim 1, wherein the electronic circuit comprises a location device adapted to receive location data.

12. The wearable device as claimed in claim 1, wherein the electronic circuit comprises a communication module.

13. The wearable device as claimed in claim 1, wherein the flexible member comprises a flexible printed circuit board.

14. The wearable device as claimed in claim 13, wherein the electronic circuit is part of the flexible printed circuit board.

15. The wearable device as claimed in claim 1, wherein the connector comprises a base portion from which extends the said more than two projecting members and a cover portion adapted to clamp onto the projecting members.

16. The wearable device as claimed in claim 15, wherein the cover portion comprises electrically insulating regions to prevent conduction between projecting members.

* * * * *